(12) United States Patent
Paragano et al.

(10) Patent No.: US 6,313,452 B1
(45) Date of Patent: Nov. 6, 2001

(54) MICROSCOPY SYSTEM UTILIZING A PLURALITY OF IMAGES FOR ENHANCED IMAGE PROCESSING CAPABILITIES

(75) Inventors: Vincent Paragano, Lawrenceville; Douglas Fremont Dixon, Hopewell; Michael R. Piacentino, Princeton; Rakesh Kumar, Monmouth Jct.; Harpreet S. Sawhney, Cranbury; Lambert E. Wixson, Rocky Hill, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/217,315

(22) Filed: Dec. 21, 1998

Related U.S. Application Data

(60) Provisional application No. 60/088,779, filed on Jun. 10, 1998.

(51) Int. Cl.[7] ................................................. G02B 27/64
(52) U.S. Cl. ........................ 250/201.3; 359/368; 348/79
(58) Field of Search ............................. 250/201.1, 201.2, 250/201.3, 548, 216, 559.08; 359/368, 380, 391, 393; 348/79, 80; 382/284, 294

(56) References Cited

U.S. PATENT DOCUMENTS 4,673,988 * 6/1987 Jansson et al. ........................ 348/79

* cited by examiner

Primary Examiner—John R. Lee
Assistant Examiner—Kevin Pyo
(74) Attorney, Agent, or Firm—William J. Burke

(57) ABSTRACT

A microscopy system comprising a microscope including a stage, at least one magnifying lens, and a lens controller, a video capture device coupled to the microscope capturing a plurality of images of an object on the stage of the microscope and a processing subsystem receiving the plurality of images from the video capture device, in which the processing subsystem generates at least one resultant image as a function of the plurality of images. The at least one resultant image generated by the processing subsystem may include a mosaic, submosaic or a sequence of mosaics.

20 Claims, 4 Drawing Sheets

MICROSCOPY SYSTEM UTILIZING A PLURALITY OF IMAGES FOR ENHANCED IMAGE PROCESSING CAPABILITIES

This application claims the benefit of the filing date of U.S. Provisional Application No. 60/088,779, filed Jun. 10, 1998.

FIELD OF THE INVENTION

The present invention relates to the field of microscopy. More particularly, the present invention relates to a microscope coupled to a computer to provide enhanced image processing capabilities.

BACKGROUND INFORMATION

Microscopes provide a means for viewing objects under varying levels of magnification. Earlier conventional microscopes were typically stand-alone devices so that all observations and manipulations of the microscope and the object being viewed were performed directly on the microscope. These conventional microscopes basically consisted of an eyepiece through which a specimen may be viewed, lenses that provided varying levels of magnification, a stage for holding a slide containing the specimen, a first mechanical means for moving the stage, and a second mechanical means for adjusting the magnification level in order to focus the lenses. The user would use these microscopes by first placing a specimen on a slide and attaching the slide to the stage of the microscope. The user would then use the first mechanical means to position the slide under the lenses, and use the second mechanical means to focus on and magnify a portion of the specimen.

U.S. Pat. No. 5,627,442 to Engelse et al. describes another conventional type of microscope configuration, in which a microscope is coupled with an image display system. The image display system includes a camera coupled to the microscope and a computer workstation. The computer workstation may include a monitor, a keyboard and a remote platform controller. In this configuration, the camera provides an image of the object being viewed on the microscope to the workstation. The user may then manipulate the remote platform controller at the workstation to move the platform on the microscope in order to change the view of the object displayed on the monitor of the workstation.

One common shortcoming in these conventional microscope systems is their limited field-of-view capabilities. A field-of-view is the total amount of an area of interest that these microscope systems allow the user to view at any given moment in time. In these conventional microscope systems, the field-of-view is limited to what could be seen through the microscope at any specific instant in time. To see other views of the area of interest, for example, an area to the left, to the right, above or below the current view, the user must either (i) reduce the lens magnification level or (ii) move the platform to obtain a different view. However, if the user reduces the lens magnification level, this necessarily reduces the amount of detail that can be seen. If the user moves the platform, the user can see a different view, but loses part of the original view (i.e., if the user moves the platform to the left a predetermined amount, then the user will no longer be able to see an amount of the original view corresponding to the movement to the left of the platform). Another common shortcoming is the lack of image enhancement capabilities of these conventional microscope systems. More particularly, conventional microscope systems are generally limited to capturing a magnified image of an object and providing the captured magnified image to an image display system for display.

SUMMARY OF THE INVENTION

The present invention provides an interactive microscopy system comprising a computer workstation coupled to a microscope and a video capture device. The computer display system may include a processing subsystem, a display device, and a user interface device. A user may interact with the microscopy system via the user interface device.

The microscope may include a motorized stage, a lens-power setting controller, and a focus adjustment controller. The video capture device may be coupled to the microscope to capture a plurality of images of an object mounted on the motorized stage of the microscope, and provides the plurality of images to the computer workstation.

The computer workstation may then perform various image enhancements on the plurality of images based upon a user input received via the user interface device. In a first operation of the system of the present invention, the computer display system may create an overall image mosaic from the plurality of images. An image mosaic is an image with a larger field-of-view than can be seen in a single image.

In a second operation of the system of the present invention, the computer workstation may create a sub-mosaic of the overall image mosaic as a function of a user input.

In a third operation of the system of the present invention, the user may indicate a specific area of interest in the overall image mosaic. The computer workstation may then cause the video capture device to capture the plurality of images of a scanning area approximating the area of interest in a predetermined manner. The computer workstation may then create an enhanced image of the area of interest at a resolution greater than a current resolution setting of the microscope.

DETAILED DESCRIPTION

Figure 1:
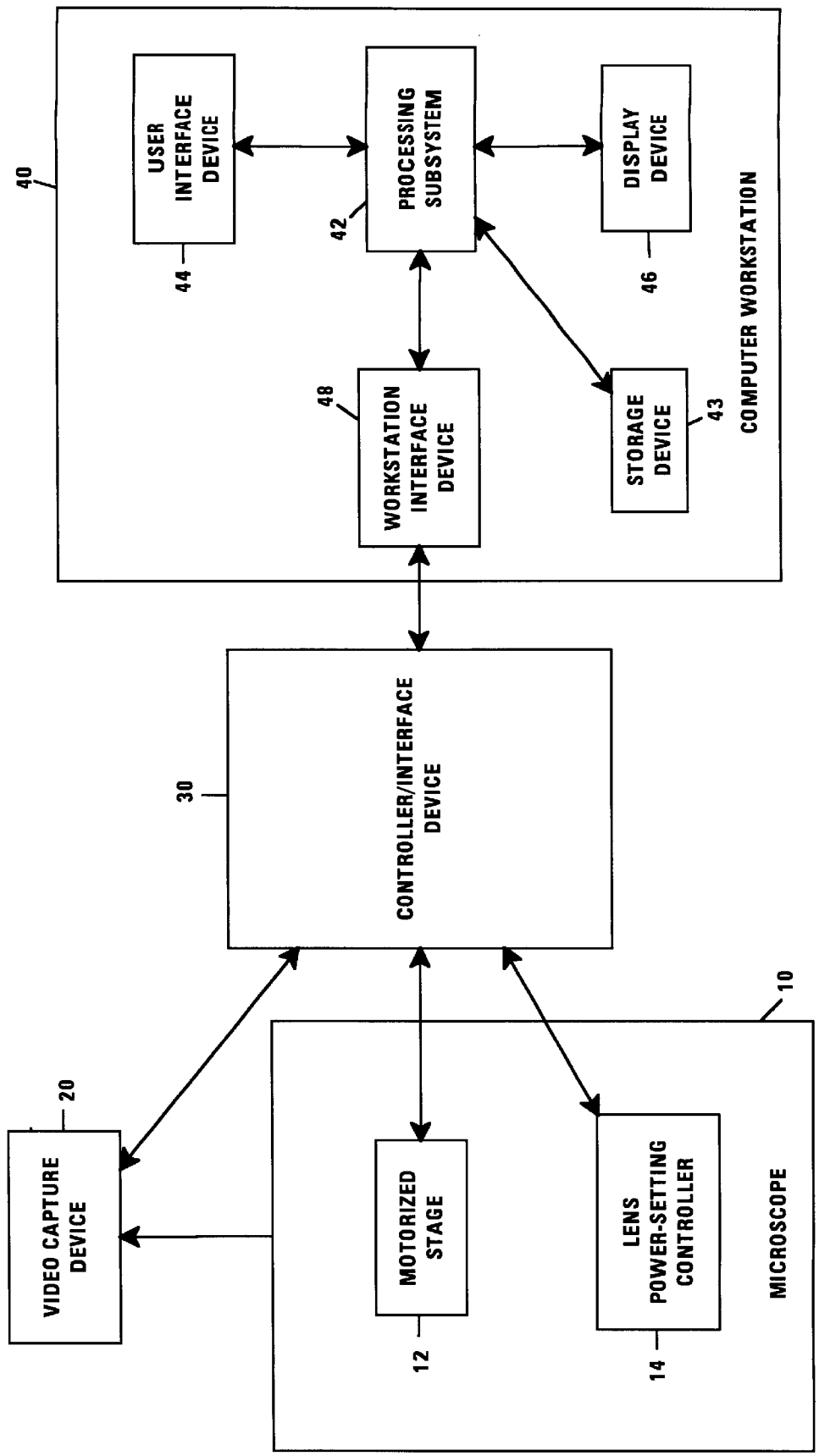
FIG. 1 shows an exemplary embodiment of an interactive microscopy system according to the present invention.

FIG. 1 shows an exemplary embodiment of an interactive microscopy system according to the present invention, which comprises a microscope 10, a video capture device 20, a controller/interface device 30, and a computer workstation 40. The microscope 10 may be of a conventional type except that it includes a motorized stage (or platform) 12 and a lens power-setting controller 14.

In conventional microscopes, a user places an object (such as a specimen on a slide) on the stage, and then manipulates the stage using a manual control system, such as knobs, located directly on the microscope to view specific areas of the object. In contrast, the present invention includes a motorized stage 12 which includes at least one motor to cause a movement of the motorized stage 12 in a selectable direction in response to a motor control signal provided to the motorized stage via the controller/interface device 30. The motorized stage 12 may, upon request from the controller/interface device 30, provide a motor status signal, which may indicate information such as, for example, a current position of the motorized stage 12. In the exemplary embodiment, the motorized stage 12 may include, for example, two stepper or DC motors (not shown) which drive the stage along two directions. For example, a first motor may drive the stage along an X-axis, and the second motor may drive the stage along a Y-axis. These axes may be determined with reference to a view seen through an eyepiece (not shown) of the microscope. Of course, the motorized stage 12 may be moved using other means within the scope of the present invention.

As in most conventional microscopes, the microscope 10 may have a plurality of lenses of different magnification powers (not shown). The lens powersetting controller 14 may be used to change between the plurality of lenses to select a specific magnification level. The lens power-setting controller 14 may be a conventional control system such as a switch or knob (not shown) located on the microscope 10, or a remote control system so that a user may select a magnification level via the computer workstation 40 and have the lens power-setting controller 14 set the microscope 10 to that magnification level. In this exemplary embodiment, the lens power-setting controller 14 may be controlled by a lens control signal provided by the controller/interface device 30. The lens power-setting controller 14 may also provide the controller/interface device 30 with a lens status signal upon a request signal from the controller/interface device 30, which provides the controller/interface device 30 with information such as, for example, the lens power-setting controller's 14 current magnification level.

The video capture device 20 may be coupled to the microscope 10 in order to capture a plurality of images of an object being viewed through the microscope 10, and provide a digitized form of the plurality of images to the controller/interface device 30. The video capture device 20 may be, for example, a CMOS imager or other low-cost digital imager such as, for example, a charge-coupled device ("CCD") camera, etc. Due to the image processing/enhancements performed in accordance with the present invention, the CMOS imager may be a low-resolution imager having such low resolutions such as, for example, 160×120. These types of video capture devices are relatively low-cost and well-known; thus, they will not be discussed further. The video capture device 20 may be controlled in response to a video capture device control signal via the controller/interface device 30 to capture the plurality of images at predetermined intervals.

The controller/interface device 30 may be, for example, a field programmable gate-array ("FPGA") or an application specific integrated circuit ("ASIC"). Using conventional semiconductor technology that are known to those skilled in the art, the controller/interface device 30 may be custom programmed to provide the capabilities to control the motorized stage 12, the lens power-setting controller 14 and the video capture device 20. The controller/interface device 30 may be coupled to the computer workstation 40 via a workstation interface device 48, so that a user working on the computer workstation 40 may control the various devices connected to the controller/interface device 30 via the controller/interface device 30. The controller/interface device 30 may provide the plurality of digitized images originating in the video capture device 20 to the computer workstation 40 via the workstation interface device 48, and receive commands via the workstation interface device 48 which are used to control the motorized stage 12 and the lens power-setting controller 14. The workstation interface device 48 may include, for example, an interface port (i.e., serial, parallel, universal serial bus, etc.) or an interface card. In this exemplary embodiment, the workstation interface device 48 may be, for example, a parallel port. Furthermore, although the controller/interface device 30 is illustrated as being separate from the computer workstation 40 in this exemplary embodiment, the controller/interface device 30 may also be an add-on that connects directly into the computer workstation 40 such as an interface card, plug-in device, etc. The controller/interface device 30 may also be integrated into the computer workstations 40.

The computer workstation 40 may also include a processing subsystem 42, a storage device 43, a user interface device 44 and a display device 46. The user interface device 44 may include devices such as, for example, a keyboard, a mouse, a trackball, etc., to allow the user to interact with the computer workstation 40, and thereby control the microscope 10 and the video capture device 20. The processing subsystem 42 may run a software driver which allows the processing subsystem 42 to communicate with the controller/interface device 30 to generate the video capture device control signals, the motor control signals, the lens control signals, and the request signal for the lens power-setting controller 14. The processing subsystem 42 may also run a software application that provides the user with an easy-to-use interface, which allows the user to control the microscopy system. For example, the software application may provide a graphic user interface ("GUI"). These type of GUIs are well-known to those skilled in the art and will therefore not be discussed further herein.

Figure 2:
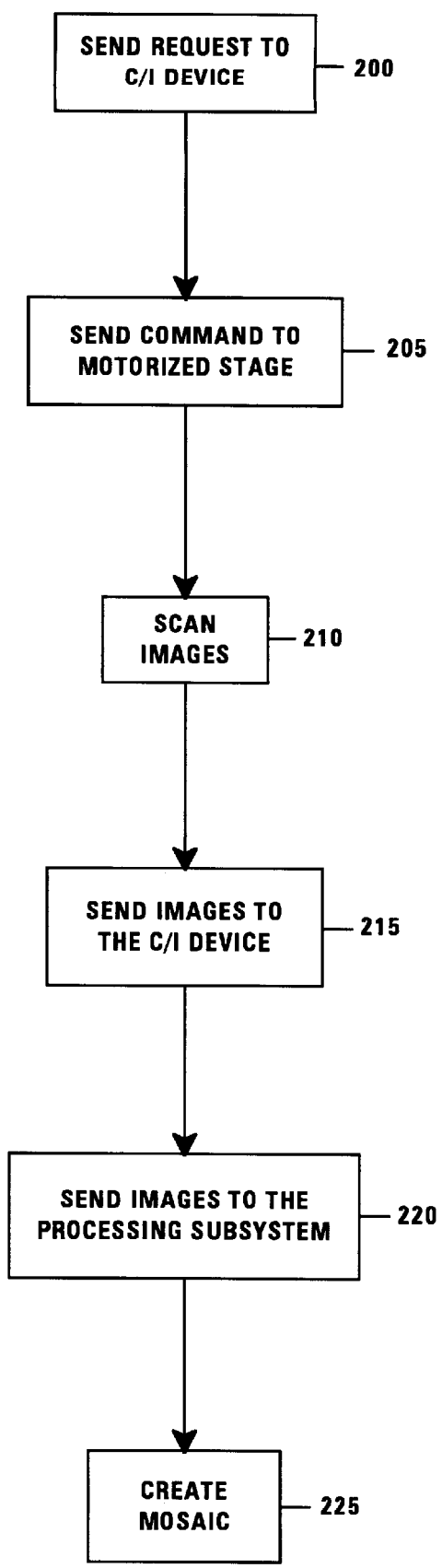
FIG. 2 is a flowchart depicting a first operation of the microscopy system in accordance with the present invention.

FIG. 2 is a flowchart depicting a first operation of the microscopy system in accordance with the present invention, in which the microscopy system constructs a mosaic of an object being viewed through the microscope. Mosaics are formed by combining a plurality of images from a specific video capture device to provide a combination image having a larger field-of-view than would be possible in any single image from the specific video capture device. By obtaining a plurality of images of a particular scene or area of interest, and correlating the images to each other or the overall scene, the plurality of images may be combined to form the mosaic. Using this mosaicing process, the microscopy system in accordance with the present invention may construct a mosaic from the plurality of images received from the video capture device 20. This addresses the shortcomings in the conventional microscopy systems which require that the user to either reduce the magnification level or move the microscope platform to view areas outside of the present view through the microscope. The microscopy system according to the present invention may receive a first image from the video capture device 20, and as the user moves the platform, instead of losing information in the first image, the system would add the information from a second image received from the video capture device 20 showing a different overall area of interest. Since, the second image may also be obtained by the video capture device 20 without changing the magnification level, there would be no loss of detail as there would be the case if the user had reduced the magnification level.

In a first step 200, the processing subsystem 42 sends a request via the workstation interface device 48 to the controller/interface device 30, so that the controller/interface device 30 will then command the video capture device 20 and the motorized stage 12, at step 205, to cooperatively capture a plurality of images of the object. At step 210, the motorized stage 12 may move in a back and forth travel path along a first axis, for example, the X-axis, and at the end of each travel path, the motorized stage 12 may move along an axis orthogonal to the first axis, for example, the Y-axis, a predetermined amount, so that the video capture device 20 may capture a plurality of images covering at least the entire object to be viewed.

At step 215, the video capture device 20 will send the plurality of images in a predetermined digitized format to the controller/interface device 30. At step 220, the controller/interface device 30 will then send the plurality of images to the processing subsystem 42 via the workstation interface device 48. At step 225, the processing subsystem 42 may then create a mosaic from the plurality of images. It is possible to send the images individually from the controller/interface device 30 to the processing subsystem 42, so that the mosaic creation may be performed in real-time. It is also possible to store the plurality of images at the controller/interface device 30, and then send all of the images at once to the processing subsystem 42.

In this exemplary embodiment, the processing subsystem 42 may create the mosaic using the exemplary techniques and algorithms described in U.S. Pat. No. 5,649,032 to Burt et al. (the "Burt '032 Patent"), which is expressly incorporated herein by reference. Using these techniques and algorithms, the microscopy system according to the present invention may create either a dynamic or static mosaic. In a dynamic mosaic, the motorized stage 12 and the video capture device 20 may continue to operate even after the mosaic has been created, so that there is a relatively continuous flow of images processed by the processing subsystem 42. Each image may then be appropriately placed in the mosaic to provide a continually updating mosaic image of the object to be viewed.

Once the processing subsystem 42 has completed forming the mosaic, the processing subsystem 42 may cause the mosaic to be displayed on the display device 46. The techniques and steps involved in displaying images on a display system are well-known and will therefore not be discussed further herein. The processing subsystem 42 may also store the mosaic to the storage device 43 for retrieval, or further processing at a later time.

In a first example of further processing that may be performed, the processing subsystem 42 may create a plurality of time-sequential mosaics. The processing subsystem 42 may then display each one of the plurality of mosaics in sequence to effectively provide a time-lapse video of the plurality of time-sequential mosaics. Alternatively, the processing subsystem 42 may process the plurality of time-sequential mosaics to detect a moving object within the plurality of timesequential mosaics. This may be performed by looking at the change in the images between the plurality of images and assuming that any change in the plurality of images is due to a moving object. Then the processing subsystem 42 may then extract the moving object from the rest of the image to separate out and isolate the background. An exemplary process that may be used is described in detail in U.S. Pat. No. 5,649,032 to Burt et al., which is expressly incorporated herein by reference. An alternative process that may be used in accordance with the present invention is described in U.S. Pat. No. 5,768,447 to Irani et al., which is expressly incorporated herein by reference. Using this process, the processing subsystem 42 may detect and track a moving object in the plurality of images, and create a timelapse video of the moving object's motion over time and superimpose this time-lapse video of the moving object on a selected background.

Another example of further processing that the processing subsystem 42 may perform would be to use the lens control signal from the lens power-setting controller 14, which has the operative magnification level at which the image was taken, and provide measurements of a section selected by the user. For example, the user may draw, via the user interface device 44, a line across an object in the mosaic or a square over the object in the mosaic. The processing subsystem 42 may then determine the length of the object (i.e., the line) or the dimensions of the square based upon the length of the line or square in the mosaic and the magnification level at which the mosaic was taken. Further, the processing subsystem 42 may store the mosaic(s) for future reference, or allow the user to attach a file storing the mosaic to an e-mail for distribution. Those skilled in the art will understand that these examples of further processing are merely exemplary and that other types of further processing may be performed within the scope of the invention.

Figure 3:
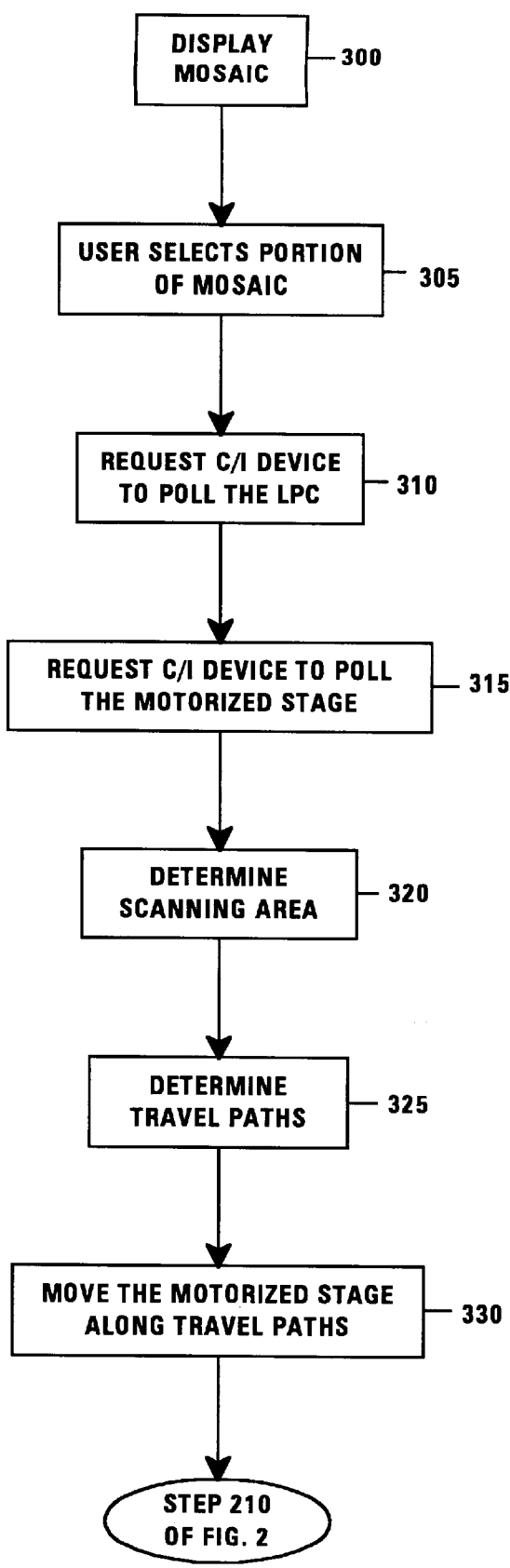
FIG. 3 is a flowchart depicting a second operation of the microscopy system in accordance with the present invention.

FIG. 3 is a flowchart depicting a second operation of the microscopy system in accordance with the present invention, in which the microscopy system may create a sub-mosaic of an overall mosaic as a function of a user input.

At step 300, the display device 46 may display an overall mosaic of the object to be viewed. The overall mosaic may be, for example, the mosaic created in the first operation shown in FIG. 1. The overall mosaic may also have been created using other methods of mosaic creation.

At step 305, a user may select a portion of the overall mosaic via the user interface device 44. The processing subsystem 42 may be running a software application that interacts with the user interface device 44 to provide an easy-to-use interface such as pull-down menus with menu items that become emphasized as a cursor controlled by the user passes over each item. The user interface device 44 may be, for example, a mouse, arrow keys, trackball, etc., that the user manipulates to control a cursor and create a box, circle, or other shape that delineates the selected portion of the overall mosaic. These types of user-interfaces are known to those skilled in the art and will not be discussed further herein.

At step 310, the processing subsystem 42 may request the controller/interface device 30 to poll the lens power-setting controller 14 to provide a current magnification level of the microscope 10 via the lens status signal provided by the lens power-setting controller 14. At step 315, the processing subsystem 42 may also request the controller/interface device 30 to poll the motorized stage 12 to provide a current position of the motorized stage 12 via the motor status signal provided by the motorized stage 12. Using the current magnification level of the microscope 10, the current position of the motorized stage 12, the known resolution of the video capture device 20, the processing subsystem 42 may determine a scanning area based upon the user-selected portion of the overall mosaic at step 320.

At step 325, the processing subsystem 42 may then determine the travel paths that the motorized stage 12 must move along corresponding to the determined scanning area, to allow the video capture device 20 to capture the areas of the object to be viewed corresponding to the user-selected portion. The travel paths may be determined as a function of the determined scanning area since the determined scanning area will define the endpoints of each one of the travel paths and the determined scanning area may be translated to precise positions of the motorized stage 12 using the current magnification level and the known resolution of the video capture device 20. The number of travel paths may be determined based upon such factors such as how much overlap is desired between the travel paths, time constraints, processing power, etc. Alternatively, the calculation of the travel paths may be performed by the controller/interface device to reduce the processing overhead of the processing subsystem 42.

Once the travel paths have been determined, then at step 330, the controller/interface device 30 controls the motorized stage 12 to move along the determined travel paths so that the video capture device 20 may capture a plurality of images corresponding to the user-selected portion of the overall image mosaic. Once these plurality of images have been captured, then the steps starting from step 215 of FIG. 2 may then be performed with these plurality of images to create and display a sub-mosaic corresponding to the user-selected portion of the overall image.

In a third operation of the microscopy system in accordance with the present invention, the microscopy system may create an enhanced resolution image of a user-selected portion of an overall mosaic a selected portion of the overall mosaic. This steps of this operation are similar to the second operation shown in FIG. 3, so this operation will only be described with reference to the differences between this operation and the second operation. As in FIG. 3, the user may indicate the selected portion via the user interface device 44. However, the user may also choose to create an enhanced resolution image of the entire mosaic.

As in FIG. 3, the processing subsystem 42 or, alternatively, the controller/interface device 30, may determine the travel paths that the motorized stage 12 must move along to allow the video capture device 20 to capture a plurality of images corresponding to either the overall mosaic or the user-selected portion. The travel paths may be determined as described with respect to FIG. 3. However, in this third operation, the travel paths may be determined so that there is a higher overlap between each set of images in the plurality of images than in previous operations. With a higher overlap, there are a greater number of images that may be used to generate any pixel in the image. The processing subsystem 42 may then create another mosaic based upon the plurality of images by performing the steps beginning at step 215 of FIG. 2. However, due to the higher overlap between each set of images, there is more information for each pixel that can be combined, which allows for a more accurate value for each pixel; thus creating an enhanced view of either the user-selected portion or the overall image.

The detail of this mosaic may be further enhanced if the current lens power setting of the microscope is not at its maximum. Before performing the third operation as described above, the lens power setting of the microscope 10 could be set to its maximum (or at least a power setting higher than the current power setting), and the plurality of images may be captured at this maximum setting. Performing the third operation at the maximum lens power setting would result in a mosaic with a higher amount of detail than would be possible than even the maximum lens power setting would allow, because the areas of overlap between images captured at this power setting would be combined to provide a more accurate representation of each specific overlapping area of the image. Thus, a resulting image would be a combination of two overlapped images at the maximum setting of the microscope 10. And the pixels in the overlapping areas would be formed by a combination of the two overlapped images, thus resulting in a more accurate representation than would even be possible by capturing an image at the microscope's 10 maximum setting.

Figure 4:
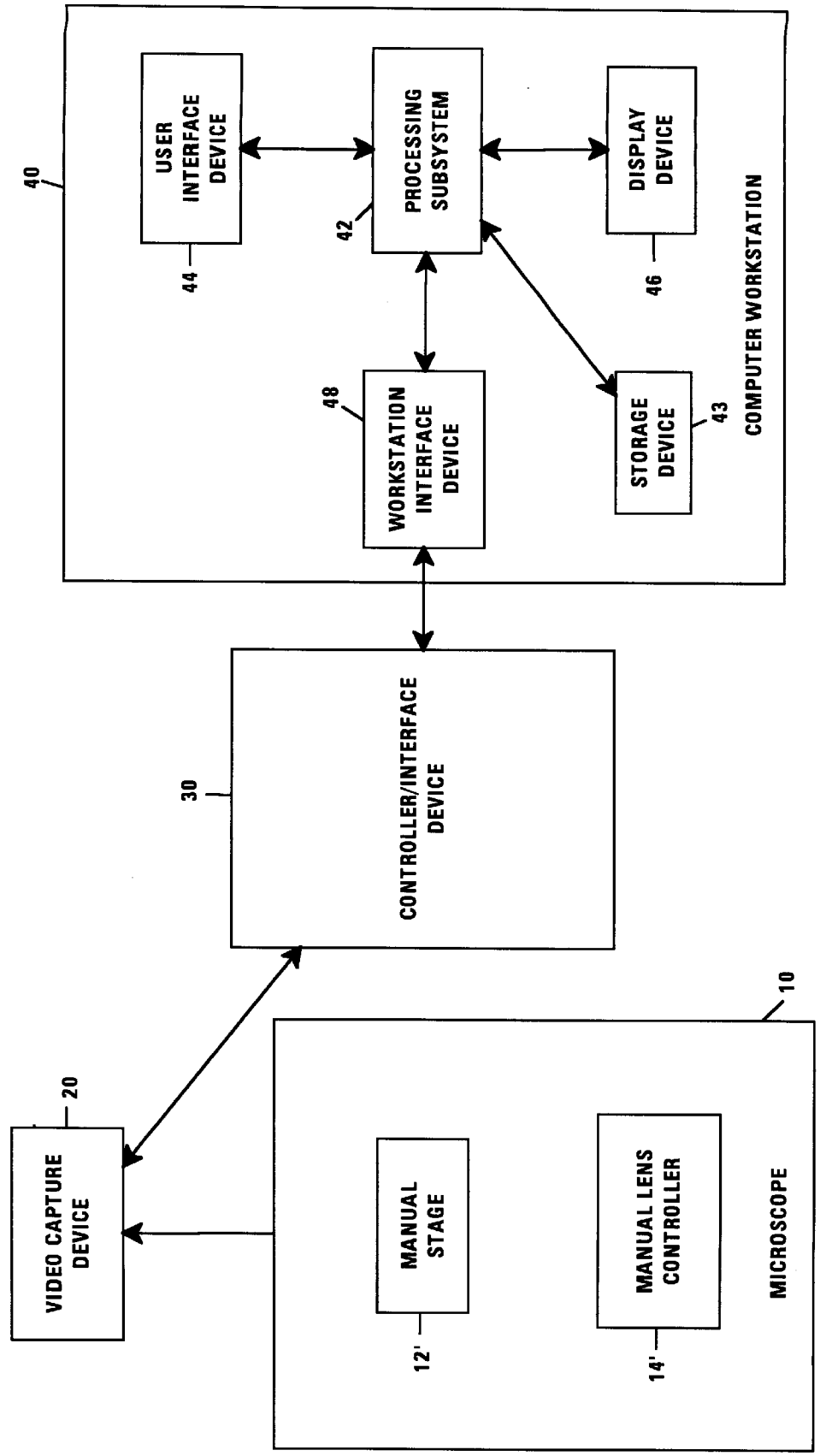
FIG. 4 shows an alternative embodiment of the interactive microscopy system according to the present invention.

In an alternative embodiment of the present invention, as shown in FIG. 4, the microscope 10 may include a manual stage 12' and a manual lens controller 14' instead of the motorized stage 12 and the lens power-setting controller 14. Besides these differences, this embodiment is substantially similar to the embodiment shown in FIG. 1. Due to these differences, however, the operation of this alternative embodiment involves substantially more interaction with the user. For example, this alternative embodiment may be implemented to perform the operations illustrated in FIGS. 1 and 2, but instead of the motorized stage 12 and lens power-setting controller 14 being controlled by the controller/interface device 30 and the processing subsystem 42, the manual stage 12' and the manual lens controller 14' must be operated and set by the user. Otherwise, the operation of this alternative embodiment is substantially identical to the embodiment of FIG. 1. Although the user will probably not be as accurate in controlling the manual stage 12' and the manual lens controller 14', the techniques and algorithms disclosed in the Burt '032 Patent may still be used since the Burt '032 Patent does not require a substantial amount of overlap between the plurality of images.

The foregoing description of the present invention has been described with reference to specific examples. However, none of these examples are intended to limit the scope of the present invention. The specification and the drawings are accordingly to be regarded in an illustrative rather than in a restrictive sense.

What is claimed is:

1. A microscopy system comprising:

a microscope including a stage, at least one magnifying lens, and a lens controller;

a video capture device coupled to the microscope capturing a plurality of images of an object on the stage of the microscope, wherein sets of captured images overlap adjacent sets of captured images; and a processing subsystem receiving the plurality of images from the video capture device, the processing subsystem generating at least one resultant image as a function of the plurality of images.

2. The microscopy system according to claim 1, wherein the at least one resultant image includes a mosaic.

3. The microscopy system according to claim 2, wherein the stage of the microscope includes a motorized stage, the microscopy system further comprising:

a controller/interface device coupling the motorized stage to the processing subsystem, wherein the processing subsystem causes the motorized stage to traverse a first plurality of predetermined travel paths via the controller/interface device, and wherein the plurality of images corresponds to a plurality of positions of the motorized stage along the first plurality of predetermined travel paths.

4. The microscopy system according to claim 3, wherein the microscope further includes a position sensor coupled to the motorized stage, the position sensor providing position data regarding the plurality of positions of the motorized stage to the processing subsystem, and wherein the processing subsystem controls the motorized stage as a function of the position data.

5. A microscopy system comprising:

a microscope including a stage, at least one magnifying lens, and a lens controller;

a video capture device coupled to the microscope capturing a plurality of images of an object on the stage of the microscope; and a processing subsystem receiving the plurality of images from the video capture device, the processing subsystem generating at least one resultant image including a mosaic as a function of the plurality of images, wherein the at least one magnifying lens includes a plurality of magnifying lenses, wherein the plurality of images are captured through a selected one of the plurality of magnifying lenses, wherein the lens controller includes a lens power-setting controller for setting the microscope to the selected one of the plurality of magnifying lenses, the microcopy system further comprising:

a controller/interface device coupling the lens power-setting controller to the processing subsystem, wherein the processing subsystem selects the selected one of the plurality of magnifying lenses via the controller/interface device and conveys the selection to the lens power-setting controller via the controller/interface device to set the microscope to the selected one of the plurality of magnifying lenses.

6. The microscopy system according to claim 5, wherein the video capture device further captures a second plurality of images of the object on the stage using a second one of the plurality of magnifying lenses, the second one of the plurality of magnifying lenses having a greater magnification power than the first one of the plurality of magnifying lenses, and wherein the processing subsystem generates a second mosaic from the second plurality of images.

7. The microscopy system according to claim 2, further comprising:

a user interface device coupled to the processing subsystem, the user interface device conveying a user input to the processing subsystem, wherein the user input indicates a selected area of the mosaic, and wherein the processing subsystem generates a submosaic of the selected area of the mosaic.

8. The microscopy system according to claim 3, wherein the processing subsystem causes the motorized stage to travel along a second plurality of predetermined travel paths, wherein the video capture device captures a second plurality of images corresponding to a second plurality of positions of the motorized stage along the second plurality of predetermined travel paths, a first distance separating adjacent paths of the first plurality of predetermined travel paths, a second distance separating adjacent paths of the second plurality of predetermined travel paths, the second distance being smaller than the first distance, and wherein the processing subsystem generates a second resultant image from the second plurality of images.

9. A microscopy system comprising:

a microscope including a stage, at least one magnifying lens, and a lens controller;

a video capture device coupled to the microscope capturing a plurality of images of an object on the stage of the microscope; and a processing subsystem receiving the plurality of images from the video capture device, the processing subsystem generating at least one resultant image as a function of the plurality of images, wherein the at least one resultant image includes a plurality of sequential mosaics.

10. The microscopy system according to claim 9, further comprising:

a display device coupled to the processing subsystem, wherein the processing subsystem displays the plurality of sequential mosaics in a predetermined order on the display device.

11. The microscopy system according to claim 9, wherein the processing subsystem detects an object moving independently of the microscopy system in the plurality of sequential mosaics.

12. The microscopy system according to claim 11, wherein the processing subsystem extracts the moving object from the plurality of sequential mosaics.

13. The microscopy system according to claim 11, wherein the processing subsystem generates a plurality of sequential images of the moving object, and wherein the processing subsystem displays the plurality of sequential images of the moving object on the display device.

14. A method for generating at least one mosaic from a plurality of images of an object on a stage of a microscope, the method comprising the steps of:

moving the stage of the microscope in a first plurality of predetermined travel paths;

capturing the plurality of images of the object, via a video capture device, corresponding to a plurality of positions of the stage along the first plurality of predetermined travel paths;

providing the plurality of images to a processing subsystem, wherein sets of captured images overlap adjacent sets of captured images; and generating the at least one mosaic, via the processing subsystem, as a function of the plurality of images.

15. The method according to claim 14, the method further comprising the step of:

determining a position of the stage of the microscope along the first plurality of predetermined travel paths via a position sensor, wherein the stage of the microscope includes a motorized stage, and wherein the processing subsystem controls the motorized stage as a function of the determined position of the motorized stage.

16. The method according to claim 14, wherein the at least one mosaic includes a plurality of sequential mosaics.

17. The method according to claim 16, further comprising the step of detecting an object moving independently of the microscope in the plurality of sequential mosaics.

18. A method for generating at least one mosaic from a plurality of images of an object on a stage of a microscope, the microscope including a plurality of magnifying lenses, the method comprising the steps of:

setting the microscope to a selected one of the plurality of magnifying lenses;

capturing the plurality of images of the object using the selected one of the plurality of magnifying lenses, via a video capture device;

providing the plurality of images to a processing subsystem, wherein sets of captured images overlap adjacent sets of captured images; and generating the at least one mosaic, via the processing subsystem, as a function of the plurality of images.

19. The method according to claim 18, further comprising the steps of:

setting the microscope to a second one of the plurality of magnifying lenses, the second one of the plurality of magnifying lenses having a greater magnification level than the selected one of the plurality of magnifying lenses;

capturing a second plurality of images of the object using the selected one, via the video capture device;

providing the second plurality of images to the processing subsystem; and generating at least one second mosaic, via the processing subsystem, as a function of the second plurality of images.

20. The method according to claim 18, wherein the at least one mosaic includes a plurality of sequential mosaics, the method further comprising the step of detecting an object moving independently of the microscope in the plurality of sequential mosaics.

* * * * *